US011617010B1

(12) United States Patent
Wu et al.

(10) Patent No.: US 11,617,010 B1
(45) Date of Patent: Mar. 28, 2023

(54) HIGH DYNAMIC RANGE VIDEO CONTENT STITCHING

(71) Applicant: Amazon Technologies, Inc., Seattle, WA (US)

(72) Inventors: Yongjun Wu, Bellevue, WA (US); Charles Benjamin Franklin Waggoner, Portland, OR (US); Sitaraman Ganapathy, Issaquah, WA (US); Vasanthakumar Soundararajan, Seattle, WA (US); Alon Dulce, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 141 days.

(21) Appl. No.: 16/948,742

(22) Filed: Sep. 30, 2020

(51) Int. Cl.
*H04N 21/4402* (2011.01)
*H04L 65/1069* (2022.01)
*H04N 21/438* (2011.01)
*H04L 65/75* (2022.01)

(52) U.S. Cl.
CPC ..... *H04N 21/4402* (2013.01); *H04L 65/1069* (2013.01); *H04L 65/75* (2022.05); *H04N 21/438* (2013.01)

(58) Field of Classification Search
None
See application file for complete search history.

(56) References Cited

U.S. PATENT DOCUMENTS

| 2017/0186141 | A1* | 6/2017 | Ha | H04N 9/646 |
| 2021/0377573 | A1* | 12/2021 | Ferrara | H04N 19/98 |
| 2021/0409796 | A1* | 12/2021 | McGilvray | H04N 21/2353 |

* cited by examiner

*Primary Examiner* — Omar S Parra
(74) *Attorney, Agent, or Firm* — Weaver Austin Villeneuve & Sampson LLP

(57) ABSTRACT

Methods and apparatus are described that relate to stitching different streams of high dynamic range (HDR) content together and handling HDR metadata mismatches between the differently produced content streams.

16 Claims, 6 Drawing Sheets

HIGH DYNAMIC RANGE VIDEO CONTENT STITCHING

BACKGROUND

High dynamic range (HDR) video refers to the production and/or display of video content according to a set of standards that capture far more of the natural dynamic range of a scene than previous technologies, theoretically approaching the dynamic range of the human eye. HDR video is typically characterized by a more natural color space (e.g., the Rec.2020 or DCI-P3 color spaces), a high dynamic range transfer function (e.g., the PQ or HLG transfer functions), a bit depth of at least 10 bits per channel, and metadata representing various information about the content and the mastering environment in which the content was produced (e.g., the transfer function used, the maximum and frame average brightness of the content and display, etc.).

The Society of Motion Picture and Television Engineers (SMPTE) standard SMPTE ST 2084 defines the PQ transfer function for translating digital values into the HDR brightness range and provides the basis for the HDR10 Media Profile implementation standard. According to the HDR10 standard, the HDR10 metadata are transmitted to the client with the video elementary bitstream, either in the sequence parameter set (SPS) or the Supplemental Enhancement Information (SEI), e.g., wide color gamuts, transfer function, and bit depth in the SPS, and content light level information and mastering display related metadata in the SEI. Although these metadata for a given media presentation may be repeatedly provided to the client during a playback session, they are static for a given media presentation and playback session.

The primary content of a media presentation is often combined with secondary content (e.g., advertisements) during playback. This dynamic content "stitching" may be achieved in a variety of ways. Regardless of the manner in which the stitching is achieved, it is unlikely that the secondary content will have the same characteristics as the primary content. This is particularly true for HDR content in that the specific manner in which the primary HDR content was produced is unlikely to match the manner in which the secondary HDR content was produced. In the context of HDR video produced according to the HDR10 standard, this results in a mismatch between the HDR10 metadata associated with the primary content and that associated with the secondary content. Currently the HDR10 standard does not define the behavior of the client device in response to such a mismatch and so, depending on the device, this may result in undesirable circumstances including, for example, a degradation in video quality or even session failure.

One solution to this issue is to update the HDR10 standard to define how to handle such mismatches. However, such an update has yet to occur and, in any event, will only be useful for client devices that are produced in the future in accordance with the updated standard. It will not solve the problem for the large installed base of existing client devices that employ the HDR10 standard.

DETAILED DESCRIPTION

This disclosure describes various techniques for handling mismatches between the HDR10 metadata of primary content and the HDR10 metadata of secondary content in the context of content stitching. Secondary content may include content that is dynamically selected during playback (e.g., advertisements, public service announcements, etc.), as well as more static content that is selected prior to playback (e.g., legal notices, studio or production company logos, alternative credits, pre-roll media, post-roll media, etc.). An example will be instructive.

Figure 1:
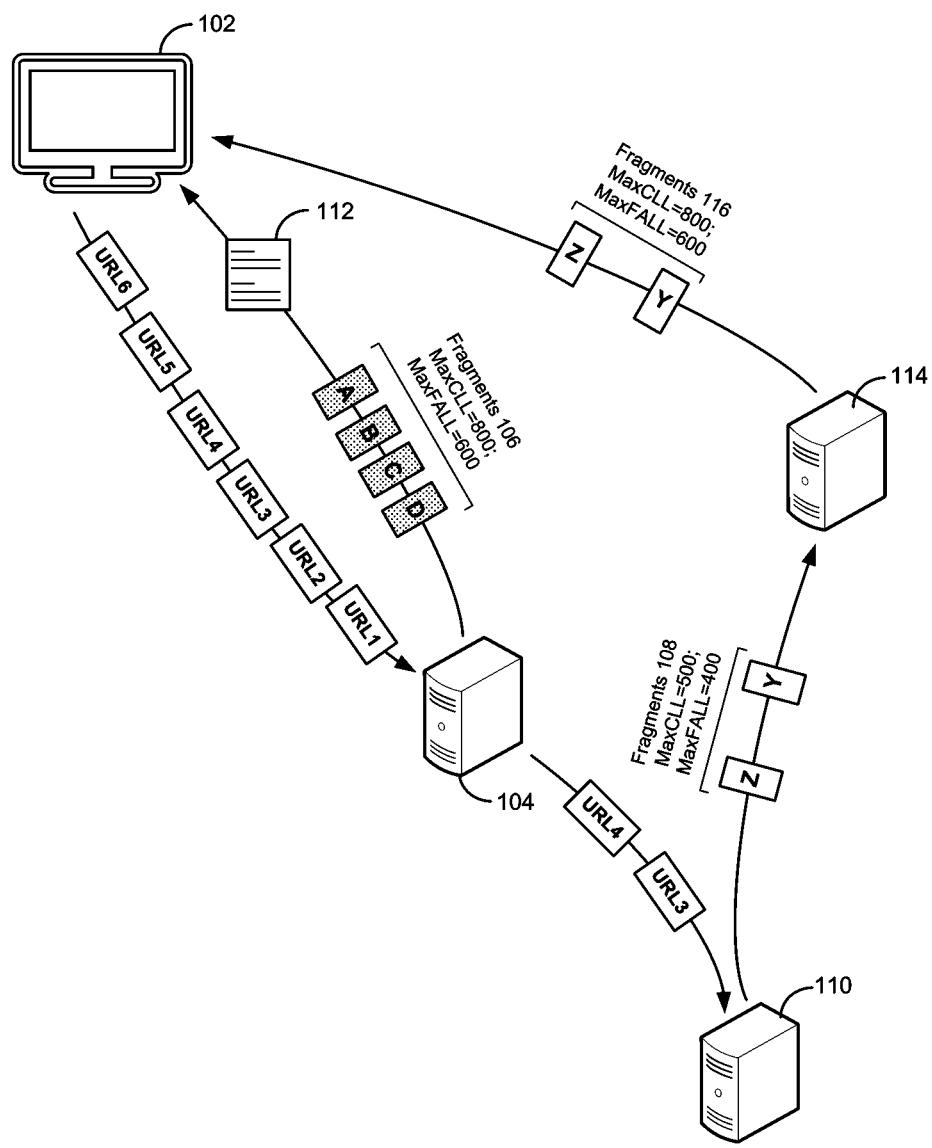
FIG. 1 illustrates an example of the operation of a particular implementation enabled by the present disclosure.

FIG. 1 illustrates an example of a situation in which a client device 102 is streaming HDR content produced according to the HDR10 standard from a content service 104. In the depicted example, HDR video fragments 106 (e.g., fragments A-D) of a main presentation originate from content service 104 and video fragments 108 (e.g., fragments Y and Z) of advertising content originate from an alternate platform 110, e.g., an advertising exchange. Fragments 108 may be HDR fragments with different HDR10 metadata, but might also be standard dynamic range (SDR) fragments.

Insertion of fragments 108 into the content stream may be achieved, for example, by providing client device 102 with a manifest 112 that includes URLs (e.g., URL1-URL6) for requesting fragments with some of the URLs (e.g., URL3 and URL4) representing interstitial periods of the content stream in which the ad fragments are to be inserted. When client device 102 uses these URLs to request the next fragment(s) of the stream, content service 104 recognizes and redirects the requests to platform 110 for selection and delivery of ad fragments 108. It will be understood that this is merely one way in which content stitching may be accomplished and that, in general, the manner and details of content stitching are not particularly relevant to the issue being illustrated in this example.

Because fragments 106 of the main presentation are produced (e.g., captured, encoded, packaged) differently than advertising fragments 108, even if fragments 108 are HDR10 fragments, the metadata associated with each are almost guaranteed to be different. For example, the HDR10 metadata representing content light level information and communicated in SEI messages would be different for fragments 106 and 108. These metadata, including parameters referred to as MaxCLL and MaxFALL, identify upper bounds for the nominal target brightness light level of the pictures of a video sequence and allow client devices to adjust the brightness of the content stream to match their own display limits.

More specifically, MaxCLL (i.e., the Maximum Content Light Level) defines the maximum light level of any single pixel within an HDR presentation. MaxFALL (i.e., the Maximum Frame Average Light Level) defines the maximum average light level for any single frame within an HDR presentation. Together, these two values define how bright any individual pixel within a frame can be, and how bright a frame as a whole can be.

As discussed above, because HDR10 metadata are defined to be static for a given media presentation and streaming session, and because the HDR10 standard does not define client device behavior when such a mismatch occurs, any of a wide variety of undesirable results might occur that negatively affect the streaming session in which client device 102 is engaging. For example, as shown in FIG. 1, the metadata for the main presentation associated with fragments 106 specify values of 800 and 600 for MaxCLL and MaxFall, respectively, while the metadata for the ad associated with fragments 108 specify values of 500 and 400. For a given client device, this mismatch might result in the degradation of video quality for one or both of the content presentations, or worse.

Therefore, according to various implementations enabled by the present disclosure, a variety of strategies may be employed to mitigate the possible effects of this mismatch. According to a particular class of implementations, the secondary content (in this example, the ad) is decoded (if necessary), tone-mapped using the HDR10 metadata values of the primary content, and encoded on the fly such that its metadata match the metadata for the main presentation. In the example of FIG. 1, fragments 108 received by server 114 are decoded, tone-mapped using the values of MaxCLL and MaxFALL values associated with the 106 of the main presentation, i.e., 800 and 600, and re-encoded as fragments 116.

It should be noted that the functions performed by server 114 in this example can be integrated with platform 110 or content service 104. It should also be noted that run time manipulation of content and/or HDR10 metadata is only one class of implementations for handling such mismatches.

Figure 2:
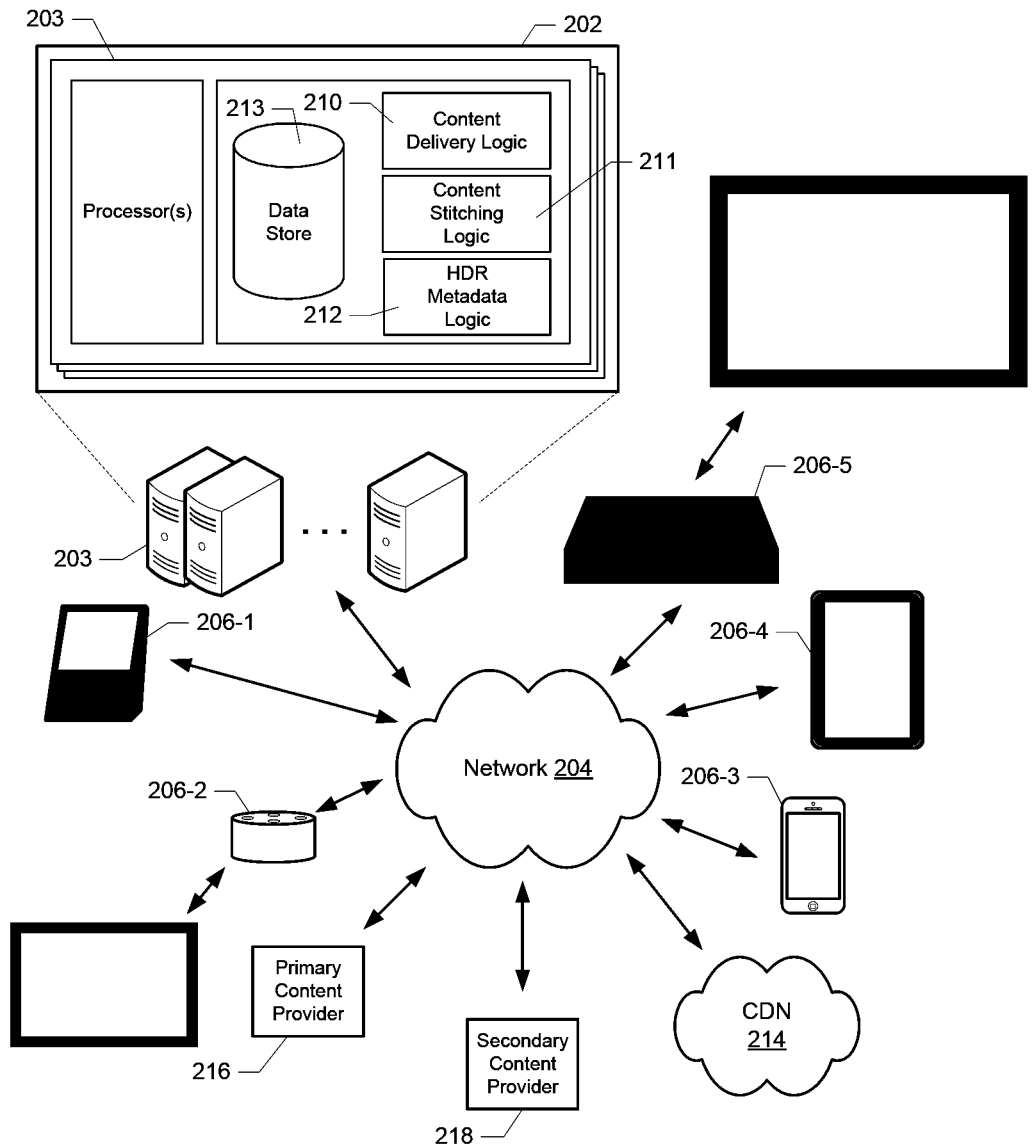
FIG. 2 depicts an example of a computing environment in which implementations enabled by the present disclosure may be practiced.

FIG. 2 illustrates an example of a computing environment in which a video content service 202 provides HDR video content via network 204 to a variety of client devices (206-1 through 206-5) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming HDR content provided by service 202. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with or includes the platform(s) that provides the primary HDR content and the secondary HDR content to client devices, as well as supports the stitching of HDR content as enabled by the present disclosure. However, it will be understood that content service 202 may provide access to primary and/or secondary HDR content in conjunction with one or more content delivery networks (e.g., CDN 214) that may or may not be independent of content service 202. In addition, the source(s) of one or both of the primary HDR content and the secondary HDR content may be independent of or integrated to various degrees with content service 202 (e.g., as represented by primary content provider 216 and secondary content provider 218). Implementations are contemplated in which HDR content may be stitched and/or encoded, and/or HDR metadata manipulated by a service that is integrated with a content service (e.g., 202), by a service associated with the content provider (e.g., 216 or 218), or as a third-party service. The range of variations known to those of skill in the art are contemplated to be within the scope of this disclosure.

In addition to content delivery logic 210 (which facilitates various aspects of content delivery to client devices 206), content service 202 may include content stitching logic 211 that facilitates the stitching of HDR content streams, and HDR metadata logic 212 that supports the handling of HDR metadata mismatches between stitched HDR content as enabled by the present disclosure.

Content service 202 may also include a variety of information related to the HDR video content (e.g., HDR video content and associated metadata and manifests in data store 213 to which service 202 provides access). Alternatively, such information associated with and/or about the content, as well as the content itself may be provided and/or hosted by one or more separate platforms, e.g., CDN 214 or remote cloud storage. It should be noted that, while logic 210, 211, and 212, and data store 213 are shown as integrated with content service 202, implementations are contemplated in which some or all of these operate remotely from the associated content service, and/or are under the control of an independent or more loosely integrated entity. From these examples, those of skill in the art will understand the diversity of use cases to which the techniques described herein are applicable.

Figure 3:
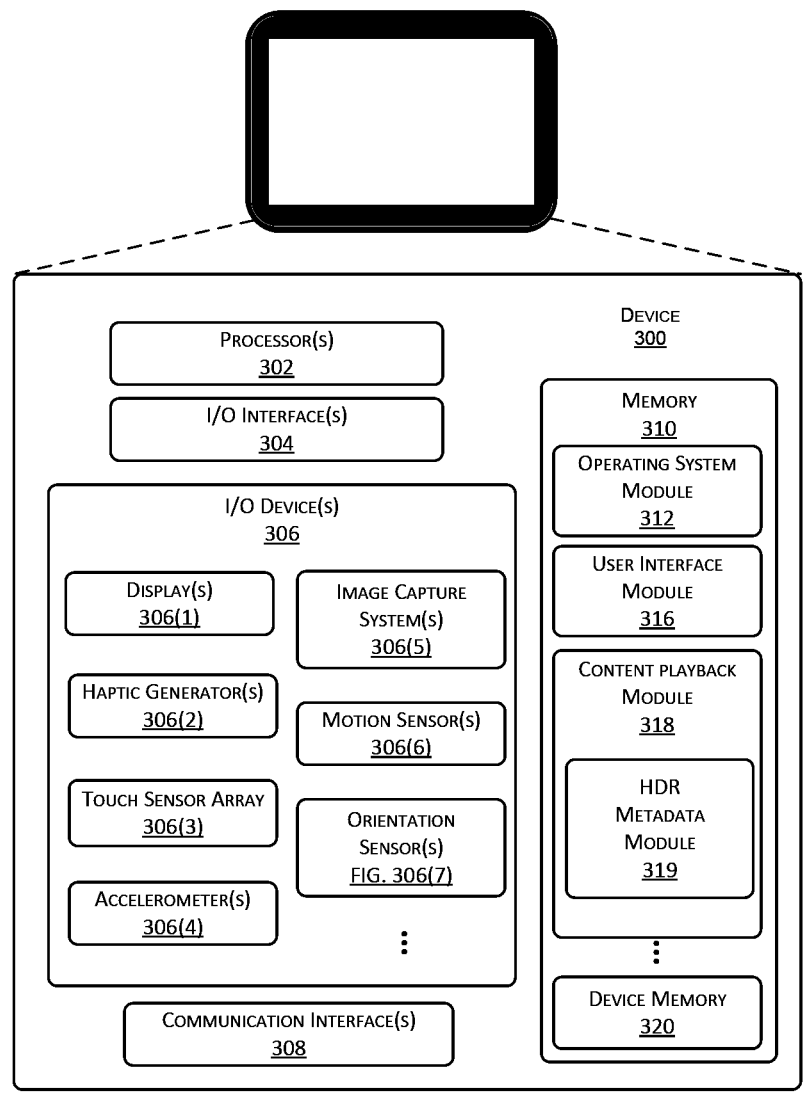
FIG. 3 is a simplified diagram of an example of a device that may be employed with various implementations enabled by the present disclosure.

A block diagram of an example of a client device 300 suitable for use with various implementations is shown in FIG. 3. As mentioned above, it should be understood that device 300 may be any of a wide variety of device types. Device 300 (depicted as a tablet device) includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 304 is coupled to one or more I/O devices 306 which may or may not be integrated with client device 300.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software (not shown) that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content playback module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

Client side logic for manipulating HDR metadata (represented by HDR metadata module 319) may be implemented in a variety of ways, e.g., in hardware, software, and/or firmware. For example, at least some of this functionality may be implemented as part of the code of a media player operating on device 300 (e.g., content playback module 318). Alternatively, module 319 may be implemented separately from and interact with the device's media player, web browser, mobile app, decoder, etc. Suitable variations and alternatives will be apparent to those of skill in the art. It will also be understood that device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

As discussed above, light level metadata (MaxCLL and MaxFALL) typically differ as between differently produced HDR content presentations that are dynamically stitched together. Another type of HDR10 metadata that may differ as between stitched content is known as SMPTE ST.2086 metadata which provides information about the mastering display used to grade the HDR content. SMPTE ST.2086 metadata includes information on six values relating to the mastering display, i.e., the three RGB primaries used, the white point used, and the display maximum and minimum light levels. Because any of these may be mismatched between stitched content, it should be understood that, despite examples described herein referring specifically to MaxCLL and MaxFALL, the solutions enabled by the present disclosure may be applied to any of these metadata.

According to one class of implementations, the potential for mismatch between the HDR10 metadata for different content is handled in the production of the secondary HDR content before any stitching occurs. As will be appreciated, such approaches are not only useful for dynamically selected stitched content such as advertisements, but also for more static content such as studio logos, alternate credits, etc.

According to one such implementation, regardless of the manner in which the HDR content is produced, the values for MaxCLL and MaxFALL are set to "0" for all primary content (e.g., the movies and TV shows in the library of a content provider) and all secondary content (e.g., ads or static content) intended for stitching with the primary content. Setting these values to "0" is a situation that is defined by the HDR10 specification. As such, it addresses the undefined behavior associated with HDR10 metadata mismatches described above. However, this option may have the potential for degrading video quality during playback, particularly for highly produced HDR content.

Figure 4:
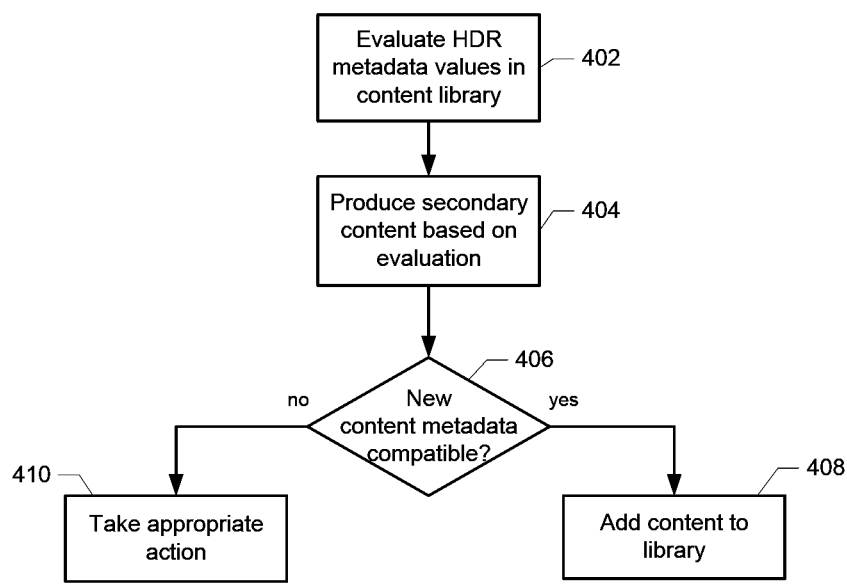
FIG. 4 is a flowchart illustrating operation of a particular class of implementations.

According to another implementation that addresses the mismatch issue during content production, the HDR10 metadata for the presentations of primary content in a library are evaluated for the purpose of determining HDR10 metadata values to use in the production of the secondary content that ensure reliable compatibility with all, most, or at least some specific portion of the primary content presentations. This approach may be understood with reference to the flowchart of FIG. 4.

The HDR10 metadata values (e.g., the values for MaxCLL and MaxFALL) associated with a set of presentations of primary HDR content (e.g., in a content library or a segment of a content library) are evaluated to determine HDR10 metadata values for use in the production of secondary content intended for stitching with the primary content presentations (402). Secondary content (e.g., ads, PSAs, studio logos, credits, etc.) is produced using the determined HDR10 metadata values (404).

The HDR10 metadata values for the primary HDR content may be evaluated in a variety of ways to determine the HDR10 metadata values for the secondary content. For example, arithmetic or geometric means for one or more of the HDR10 metadata values (e.g., one for MaxCLL and/or one for MaxFALL) across the set of primary content presentations can be used to define corresponding values for the secondary content. In another example, the metadata for the primary content can be used to define an n-dimensional space representing the primary content metadata, at or near the center of which the values for the secondary content may be identified.

More generally, the range(s) of values for the primary content metadata is used to identify a set of metadata values that will result in secondary content that is visually compatible when displayed in a stitched content stream with all, most, or some defined subset of the primary content presentations. In some cases, "visually compatible" refers to the respective brightness levels of the stitched content not being so dissimilar as to negatively affect the viewer's experience. This may be assessed, for example, based on subjective ratings from human viewers and/or more automated approaches in which, for example, brightness differences between primary and secondary content are measured.

As each new primary content title is added to the library, a check may be done to determine whether its HDR10 metadata values are compatible with the secondary content associated with the library (406). Incompatibility might arise, for example, if the metadata values for the new title deviates more than some predetermined amount from metadata values used to produce the secondary content or relative to the range(s) of values for the primary content (e.g., more than two or three standard deviations). If the metadata are compatible, the new title may be added to the library (408). If, on the other hand, the values associated with the new title are found to be incompatible, a variety of actions may be taken (410).

For example, the HDR10 metadata values associated with the new title can be used with the values for the existing set of primary presentations to define a new set of metadata values for secondary content, and any previously produced secondary content that deviates significantly from the new set of values can be eliminated as an option for stitching with the primary content of the library. Alternatively, the new title as currently produced may be excluded from inclusion in the library.

According to a specific implementation, the library of primary content may be segregated into different sub-libraries, each of which is evaluated to determine its own set of HDR10 metadata values for the production of secondary content. The secondary content intended for stitching with the primary content of each sub-library may then be produced as described above. This results in the production of multiple copies of at least some of the secondary content presentations, one for each sub-library that uses the HDR10 metadata values derived for that sub-library. One of the advantages of this approach is that new primary content may be produced and placed in the appropriate sub-library without concern that the secondary content with which the new title might be stitched will be incompatible. In addition, even with the partitioning of the primary content into sub-libraries, there might be a subset of the primary content titles that are statistical outliers in terms of their HDR metadata. For such titles, the decision can be made to disallow content stitching entirely.

According to yet another implementation, the HDR10 metadata value used to produce secondary content for a given library or sub-library may be used to select or filter additional secondary content that is allowed to be selected for stitching with the primary content of the library. For example, if the values of MaxCLL and MaxFALL used to produce secondary content for the library or sub-library are 600 and 500, respectively, additional secondary content may be selected or disallowed for dynamic stitching based on whether the corresponding metadata values match or are sufficiently close to these values. Such an approach may even be used for each primary content presentation, i.e., the specific values of HDR10 metadata for a given primary content presentation may be used to select or disallow secondary content for dynamic stitching for a given streaming session.

As will be appreciated, having a set of secondary content presentations that are produced to be compatible with a range of primary content presentations allows for the reuse of the secondary content via caching for stitching with all compatible primary presentations.

Figure 5:
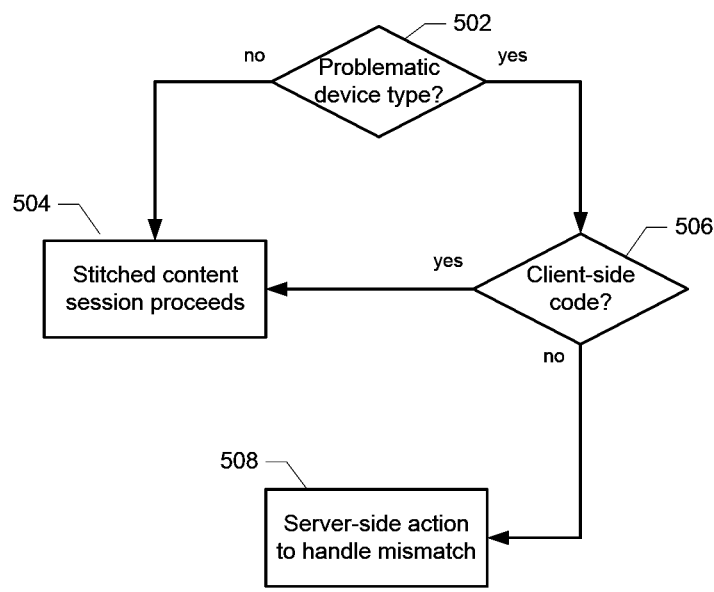
FIG. 5 is a flowchart illustrating operation of a class of server-side implementations.

According to another class of implementations, the potential for mismatch between the HDR10 metadata for different HDR content is handled at run time, e.g., in conjunction with dynamic stitching of the primary and secondary content (e.g., a server-side implementation), or in conjunction with playback of the stitched content (e.g., a client-side implementation). One example of a server-side approach is discussed above with reference to FIG. 1. Another is described below with reference to the flowchart of FIG. 5.

When a client device initiates a streaming session for a particular presentation of primary contact, it is determined whether the client is of a device type that is not capable of handling a mismatch between the HDR metadata of stitched content (502). That is, even though HDR10 metadata for a given media presentation is expected to be static, some client devices are capable of recognizing and reacting properly to changes in the values within a stitched stream. Other devices may simply ignore the change in values without significant or deleterious effects. If the requesting client device is capable of handling the mismatch, the streaming session is allowed to proceed normally (504), including the stitching of secondary content.

If, on the other hand, the requesting client device is determined to be a device type that is not capable of handling such a mismatch, it is determined whether the client device includes code (e.g., integrated with its media player) configured to manipulate the metadata at the client-side to eliminate or otherwise deal with the mismatch (506). If so, the streaming session is allowed to proceed normally (504), at least from the perspective of the service(s) from which the stitched content stream originates. An example of a client-side manipulation of HDR metadata using such client-side code is described below with reference to FIG. 6.

If the client device does not have code for manipulating the metadata, server-side action is taken to handle the mismatch (508). Depending on the implementation, this action may take a variety of forms. For example, a content stream for the requested primary content may be established with the client device that does not include secondary content. In another example, content stitching is allowed, but the HDR metadata (e.g., the values for MaxCLL and MaxFALL) for the both the primary and secondary content may be set to zero dynamically as the stitched content is streamed to the client device. As noted above, these values being set to zero is a condition for which the behavior is defined for HDR10 metadata.

In yet another example, and as described above with reference to FIG. 1, the secondary content can be converted on the fly to HDR10 content that matches or is sufficiently similar to the primary content. This might involve, for example, decoding secondary SDR content or differently produced HDR content (if necessary), tone-mapping the secondary content using the HDR10 metadata values (e.g., the MaxCLL and MaxFALL values) of the primary content, and encoding the resulting HDR content in real time. Such an approach is feasible in that secondary content is typically selected for stitching a sufficiently long time (e.g., a minute or so) before the secondary content is actually inserted in the stream.

In addition, such run time encoding can be made more efficient by saving information (e.g., motion vectors) from a previous trial encode of the secondary content for reuse during the run time encode. Secondary content generated this way can also be cached for re-use in subsequent stitched content streams for the same primary content presentation.

According to some run time implementations, action to deal with a metadata mismatch might only be taken if the mismatch for one or more of the metadata values exceeds some threshold or falls outside of some acceptable range around the corresponding metadata value(s) for the primary content. Such an approach might allow for secondary content that is generated at run time to be cached for stitching with other primary content presentations as long as the metadata mismatch between the cached secondary content and the new primary content remains within the acceptable range.

In relation to determining whether a particular client device is of a type that cannot handle metadata mismatch, implementations are contemplated in which it is determined whether any of the client devices initiating or engaging in a set of streaming sessions are of such a device type. This might be useful, for example, in the context of the broadcast of a live event, for determining whether to allocate resources for tone-mapping and encoding secondary content for the set of sessions consuming live streams for the event and/or taking advance action to support stitching for those sessions, e.g., trial encodes of the secondary content, or even tone-mapping and encoding the secondary content well ahead of the time of stitching. Of course, if there are no problematic devices among the set of client devices, none of this would need to be done.

According to another example of a server-side implementation, as long as the delta(s) between the metadata value(s) is/are not too large (e.g., does not exceed a threshold), one or more of the values of the HDR metadata for the secondary HDR content may be replaced with the corresponding value(s) associated with the primary HDR content. In some implementations, this approach might be limited to use in cases where the primary content metadata value(s) is/are larger than the corresponding secondary content metadata value(s) as the rewritten metadata value(s) will still reflect the "ground truth" of the secondary content. For example, if a MaxCLL value for secondary HDR content is changed from 500 to 600, the new value will still be greater than the maximum value for the secondary content. On the other hand, if the disparity is large, e.g., primary content MaxCLL of 4000 and secondary content MaxCLL of 120, changing the value(s) associated with the secondary content might result in the secondary content being either too dim or too bright depending on the direction of the disparity. In such cases, another approach for handling the mismatch might be used, e.g., creating a new version of the secondary content using the metadata values of the primary content. As will be appreciated, the magnitude of the disparity for which modification of the metadata value(s) for the secondary content is allowed may vary depending on a variety of factors such as, for example, the value(s) associated with the primary content and/or the secondary content, the client device type, the nature of the primary content and/or the secondary content, etc.

Figure 6:
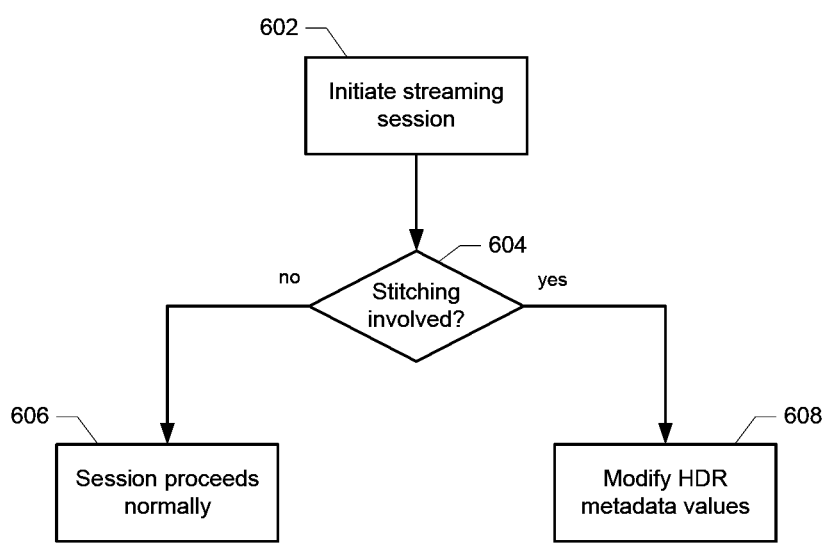
FIG. 6 is a flowchart illustrating operation of a class of client-side implementations.

An example of a client-side run-time implementation is illustrated in the flowchart of FIG. 6. When the client device that is not capable of handling HDR metadata mismatches initiates a streaming session for a primary content presentation (602), it determines whether stitching of secondary content is part of the presentation (604). This might be done, for example, by reviewing the manifest to determine if some of the fragment references correspond to secondary content. Alternatively, whether or not the session involves content stitching can be communicated to the client device (e.g., by the content service) as part of session initiation.

If no stitching is involved, the session can proceed normally (606), with the client device rendering and displaying the primary content in accordance with its HDR10 metadata.

If the presentation will include stitched content, the client device modifies the HDR metadata values (e.g., the values for MaxCLL and MaxFALL) associated with received content fragments, setting them to zero (608). According to some implementations, this might be done only for the fragments of the secondary content. According to others, this may be done for the fragments of both the primary and secondary content. As mentioned above, these metadata are not encrypted and so are available for such manipulation. Such functionality may be accomplished, for example, using a snippet of code on the client device (e.g., HDR metadata module 319) as the client's media player receives and buffers the primary and secondary content fragments for rendering and display.

According to an alternative implementation, instead of changing the metadata values to zero, the code on the client device could modify one of more of the metadata value(s) associated with the secondary HDR content to match the corresponding value(s) associated with the primary HDR content. As discussed above, such an approach might only be used where the disparity between the mismatched value (s) is not too great and/or the value(s) associated with the primary content is/are larger than the value(s) associated with the secondary content.

Ideally, HDR10 metadata mismatches will ultimately be handled by appropriately updating the HDR10 specification to define client device behavior when such mismatches are encountered. However, until that happens, and for all devices that will not be affected by such an update, HDR10 mismatches may be handled by any of the techniques enabled by the present disclosure.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system, comprising one or more computing devices configured to:
for a streaming session including primary high dynamic range (HDR) content and secondary HDR content, identify a first fragment of the primary HDR content, the primary HDR content having first HDR metadata associated, the first HDR metadata including a first value for a first parameter;

provide the first fragment of the primary HDR content for display on a client device based on the first HDR metadata;

identify a first fragment of the secondary HDR content, the secondary HDR content having second HDR metadata associated therewith, the second HDR metadata including a second value for the first parameter that is different from the first value for the first parameter;

decode the first fragment of the secondary HDR content resulting in a first segment of the secondary HDR content;

tone-map the first segment of the secondary HDR content using the first value for the first parameter;

encode the first segment of the secondary HDR content resulting in a re-encoded fragment of the secondary HDR content having third HDR metadata associated therewith, the third HDR metadata including the first value for the first parameter; and provide the re-encoded fragment of the secondary HDR content for display on the client device based on the third HDR metadata.

2. The system of claim 1, wherein the first and second HDR metadata comprise HDR 10 Media Profile (HDR10) metadata, and wherein the first parameter comprises a Maximum Content Light Level parameter (MaxCLL), a Maximum Frame Average Light Level parameter (MaxFALL), or a mastering display parameter.

3. The system of claim 1, wherein the one or more computing devices are further configured to determine that the client device corresponds to a device type that cannot handle HDR metadata mismatches.

4. The system of claim 1, wherein the one or more computing devices are further configured to determine whether the client device includes client-side code for manipulating HDR metadata.

5. The system of claim 1, wherein the one or more computing devices are configured to encode the first segment of the secondary HDR content using information saved from a previous encoding of a corresponding segment of the secondary HDR content.

6. The system of claim 1, wherein the one or more computing devices are further configured to cache the re-encoded fragment of the secondary HDR content for use in other streaming sessions.

7. The system of claim 6, wherein the one or more computing devices are further configured to use the cached re-encoded fragment of the secondary HDR content in a subsequent streaming session involving different primary HDR content, the different primary HDR content having fourth HDR metadata associated therewith that includes a third value for the first parameter that is different from the first value for the first parameter by less than a threshold amount.

8. The system of claim 1, wherein the one or more computing devices are further configured to:

determine that a difference between the first value for the first parameter and the second value for the first parameter exceeds a threshold; and proceed with generating the re-encoded fragment of the secondary HDR content based on determining that the difference exceeds the threshold.

9. The system of claim 1, wherein the one or more computing devices are configured to:

for a first set of primary HDR content presentations, evaluate primary content HDR metadata associated with the primary HDR content presentations to determine secondary content HDR metadata;

obtain a first set of secondary content presentations;

generate a second set of secondary content presentations from the first set of secondary content presentations using the secondary content HDR metadata; and provide combinations of the primary HDR content presentations of the first set of primary HDR content presentations and the secondary content presentations of the second set of secondary presentations in streaming sessions that include dynamic stitching of the primary HDR content presentations and the secondary content presentations of the second set of secondary content presentations.

10. The system of claim 9, wherein the one or more computing devices are configured to evaluate the primary content HDR metadata to determine the secondary content HDR metadata by specifying a value of a parameter included in the secondary content HDR metadata based on a processing of values for the parameter in the primary content HDR metadata.

11. The system of claim 10, wherein the secondary content HDR metadata comprise HDR 10 Media Profile (HDR10) metadata, and wherein the parameter comprises a Maximum Content Light Level parameter (MaxCLL), a Maximum Frame Average Light Level parameter (MaxFALL), or a mastering display parameter.

12. The system of claim 10, wherein the one or more computing devices are configured to process the values for the parameter in the primary content HDR metadata by determining one of an arithmetic mean, a geometric mean, or a range.

13. The system of claim 10, wherein the one or more computing devices are configured to process the values for the parameter in the primary content HDR metadata by defining an n-dimensional space representing the primary content HDR metadata.

14. The system of claim 9, wherein the one or more computing devices are further configured to cache a fragment of a first secondary content presentation of the second set of secondary content presentations for use in more than one of the streaming sessions.

15. The system of claim 9, wherein the first set of secondary content presentations comprises standard dynamic range (SDR) content presentations.

16. The system of claim 9, wherein the first set of primary HDR content presentations is one of a plurality of sets of primary HDR content presentations, each of which has associated secondary content HDR metadata, and wherein the second set of secondary content presentations is one of a plurality of sets of secondary HDR content presentations, each set of the primary HDR content presentations having a corresponding set of secondary HDR presentations generated using the corresponding secondary HDR metadata.

* * * * *